United States Patent
Tengli et al.

(10) Patent No.: US 8,914,316 B2
(45) Date of Patent: Dec. 16, 2014

(54) INFORMATION SIMILARITY AND RELATED STATISTICAL TECHNIQUES FOR USE IN DISTRIBUTED COMPUTING ENVIRONMENTS

(75) Inventors: Ashwin Tengli, Bangalore (IN); Aravindan Raghuveer, Bangalore (IN); Krishna Prasad Chitrapura, Bangalore (IN)

(73) Assignee: Yahoo!, Inc., Sunnyvale, CA (US)

( * ) Notice: Subject to any disclaimer, the term of this patent is extended or adjusted under 35 U.S.C. 154(b) by 823 days.

(21) Appl. No.: 12/534,596

(22) Filed: Aug. 3, 2009

(65) Prior Publication Data

US 2011/0029477 A1    Feb. 3, 2011

(51) Int. Cl.
*G06N 5/02*    (2006.01)
*G06N 99/00*    (2010.01)
*G06F 17/30*    (2006.01)

(52) U.S. Cl.
CPC ........ *G06F 17/30495* (2013.01); *G06N 99/005* (2013.01); *G06N 5/02* (2013.01); *G06F 17/30303* (2013.01); *G06F 17/30321* (2013.01)
USPC .......................................... 706/45; 707/749

(58) Field of Classification Search
CPC .. G06N 99/005; G06N 5/02; G06F 17/30321; G06F 17/30303; G06F 17/30495
USPC .......................................... 706/45; 707/749
See application file for complete search history.

(56) References Cited

PUBLICATIONS

Sarawagi et al ("Efficient Set joins on similarity predicates" Jun. 2004).*
Hassanzadeh et al ("Accuracy of Approximate String Joins Using Grams" Sep. 2007).*
Lee et al ("To Maximize Web Service Retrieval" 2007).*
Hadjieleftheriou et al ("Fast Indexes and Algorithms for Set Similarity Selection Queries" 2008).*
Xiao et al ("Efficient Similarity Joins for Near Duplicate Detection" Apr. 2008).*
Zhou et al ("Data Cleaning and Record Linkage Research in Asia" Jul. 2009).*
"Hadoop: Open source implementation of MapReduce" http://hadoop.apache.org/, last published Jul. 16, 2009, retrieved Jul. 28, 2009, 2 pages.
Olston, et al. "Pig latin: A Not-So-Foreign Language for Data Processing" ACM SIGMOD '08, Vancouver, BC, Canada, Jun. 9-12, 2008, pp. 1099-1110.
Xiao, et al. "Efficient Similarity Joins for Near Duplicate Detection" WWW 2008, Beijing, China, Apr. 21-25, 2008, pp. 131-140.
Bayardo, et al. "Scaling Up All Pairs Similarity Search" WWW 2007, Banff, Alberta, Canada, May 8-12, 2007, pp. 131-140.
Arasu et al. "Efficient Exact Set-Similarity Joins" VLDB '06, Seoul, Korea, Sep. 12-15, 2006, pp. 918-929.
Chaudhuri et al. "A Primitive Operator for Similarity Joins in Data Cleaning" Proceedings of the 22nd International Conference on Data Engineering, Apr. 3-7, 2006, 12 pages.
Strohman et al. "Optimization Strategies for Complex Queries" ACM SIGIR '05, Salvador, Brazil, Aug. 15-19, 2005, pp. 219-225.

(Continued)

*Primary Examiner* — Lut Wong
(74) *Attorney, Agent, or Firm* — Berkeley Law & Technology Group, LLP (57) ABSTRACT

Embodiments of methods, systems and/or apparatuses relating to data processing in distributed computing environments are disclosed. In particular, methods, systems, and/or apparatuses for determining information similarly and/or performing related statistical techniques which may be implemented or operated in a distributed computing environment are disclosed.

22 Claims, 5 Drawing Sheets

(56) References Cited

PUBLICATIONS

Dean et al. "MapReduce: Simplified Data Processing on Large Clusters" Proceedings of the 6th conference on Symposium on Operating Systems Design & Implementation, San Francisco, CA, Dec. 6-8, 2004, 13 pages.

Turtle et al. "Query Evaluation: Strategies and Optimizations" Information Processing and Management, vol. 31, No. 6, Nov. 1995, pp. 831-850.

Sarawagi et al. "Efficient Set Joins on Similarity Predicates" ACM SIGMOD 2004, Paris, France, Jun. 13-18, 2004, 12 pages.

* cited by examiner

INFORMATION SIMILARITY AND RELATED STATISTICAL TECHNIQUES FOR USE IN DISTRIBUTED COMPUTING ENVIRONMENTS

BACKGROUND

1. Field

The subject matter disclosed herein relates generally to data processing, and more specifically to methods, apparatuses, and/or systems for use in distributed computing environments.

2. Information

Information reposed in a digital form, such as information in the form of binary digital signals, is continually being generated or otherwise identified, collected, or stored. Due in part to the vast amount of information available, there may occasionally be a desire to identify similarities or dissimilarities among this information. This may be useful, for example, for information mining, information integration, information cleaning, or other applications or purposes. While various ways exist to identify similar or dissimilar information, a common approach employs a technique called "similarity join". Similarity join is a technique which may compare records to identify similarities or dissimilarities. For example, a record pair may be considered similar if a similarity function used by similarity join returns a value that is greater than a threshold, as just an example.

While some similarity join techniques may provide a reasonable approach to identify similar or dissimilar information, in certain situations such techniques may prove less desirable. For instance, some similarity join techniques may be less feasible or less efficient with respect to determining similarity or dissimilarity on large amounts of information. In addition, one or more optimizations may be performed during some similarity join techniques to prune false positive candidate pairs; some of these optimizations may introduce further challenges. Thus, it may be useful to employ methods and/or systems that identify similar or dissimilar information in a more efficient or effective manner, and/or to prune false positive candidate pairs in a more efficient or effective manner.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some portions of the detailed description which follow are presented in terms of algorithms or symbolic representations of operations on binary digital signals which may be stored within a memory of a specific apparatus or special purpose computing device or platform. In the context of this particular specification, the term specific apparatus, computing platform, or specific computing platform, or the like, may include a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" or a "certain embodiment" means that a particular feature, structure, or characteristic described in connection with the embodiment is included in at least one embodiment of claimed subject matter. Thus, the appearances of the phrase "in one embodiment" or "an embodiment" or a "certain embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

As mentioned previously, it may be desirable to identify similar or dissimilar information in a more efficient or effective manner. Here, for convenience and ease of readability, it is understood that the terms "similar" or "similarity" may be used to denote both their plain and ordinary meaning and that of their anonyms "dissimilar" and "dissimilarity." Thus, this practice may spare the use of wordy phrases like "similar or dissimilar" or "similarities or dissimilarities" repeated throughout this description. Of course, it is understood that if a particular process, system, or apparatus is capable of identifying "similar" information or "similarities" between information, it is likewise capable of determining "dissimilar" information or "dissimilarities" between information. Accordingly, and again for convenience only, the terms "similar" or "similarity" may be used where "dissimilar" or "dissimilarity" may likewise apply. Of course, this practice may not hold true in all instances; thus, the scope of claimed subject matter is not to be limited in this respect.

Identifying similarities between information may be useful for many applications or purposes, such as information mining, information integration, information cleaning, information extraction, or the like. While various ways exist to identify similar information, one common approach to do so utilizes a similarity join technique. To illustrate one example of a similarity join technique, suppose, for example, that a similarity join process were to be used to compare records on two tables. Here, in this context, the term "record" refers to information, such as text, images, documents, files, or the like, in the form of signals, such as binary digital signals, as non-limiting examples. Here, a similarity join operation may access these two tables and attempt to identify pairs of records that are similar. Pairs of records may be considered similar if a similarity function used by similarity join returns a value that is greater than a threshold. For instance, a similarity join operation may use a similarity function F such that "F(R.value, S.value)>t", where R.value and S.value are values associated with record R and record S, respectively, and t is some threshold on a similarity score. Here, similarity function F may be generalized in terms of similarity based on overlap coefficient or vector dot product, as just two examples. In this way, a similarity join process may produce candidate pairs, such as candidate key pairs R.key and S.key, by computing bounds on the similarity. Generally, all candidate pairs whose true similarity is greater than threshold may be present in a candidate pair list.

While similarity join is a common approach to identify information similarities, there potentially may be challenges with its use. For instance, a similarity join approach may be less feasible, or less efficient with respect to determining similarity on large amounts of information. This may potentially arise due, in part, to similarity join's reliance on indexing, in which a computation tends to be sequential in nature. To illustrate, one typical comparison for similarity join may be to compare records containing text to determine which records are syntactically similar. Here, a similarity join operation may compare every record in table one with every record in table two. The computational complexity of this approach may be quadratic in the number of records in table one and table two. Accordingly, in this example, similarity join may scale generally in terms of data storage by distributing the index storage; it may not, however, achieve computation parallelism. Hence, it may be less feasible or less efficient to compute similarity joins on large amounts of information.

Potential limitations of performing similarity join on large datasets may be more evident if viewed in a particular context. In an online advertising context, for instance, it may be desirable to find similarity between particular advertisements associated with particular web pages or similarity between two or more advertisements generally. Identifying similarity between advertisements and web pages, for example, may involve computing similarity join between potentially millions of advertisements and millions of web pages. Adding to this complexity, a similarity may occur only in a segment of web page and, in that case, a join may blow up to matching potentially millions of advertisements to potentially billions of web page segments, as just an example. Likewise, identifying advertisements similar to other advertisements may pose an analogous challenge of scale where a pairwise similarity score between potentially millions of advertisements may be computed.

Since performing similarity join on large quantities of information, or in particular contexts, may be onerous, various improvements or optimizations have been suggested which may reduce its computational complexity. The aim of some of these optimizations is generally two-fold: first, generate candidate pairs with as little computation (e.g., computation time) as possible; and, second, generate as few candidate pairs as possible. Generally speaking, these various optimizations may speed up the similarity join computation, such as by reducing the number of records to compare, which may reduce computation cost to less than quadratic. Like similarity join, however, one challenge of these various approaches may be that, even working in concert, they may not reduce computational cost to levels which may be desirable for processing large quantities of information, as just an example.

With these and other concerns in mind, in accordance with certain aspects of the present description, example embodiments or implementations may include methods or systems to determine information similarity in a distributed computing environment. In certain embodiments, these exemplary methods or systems may be scalable in terms of both computation and information storage, and may be capable of being implemented or operated in a distributed storage or parallel computational environment. For example, in certain embodiments, an information similarity determination process may be performed via one or more iterations in a map/reduce framework. Here, for example, one or more map/reduce iterations may use record statistics, such as record statistics determined by a first map job, or other attributes, to perform some part of the information similarity determination process or one or more optimizations. In certain implementations, an information similarity determination process may include all or portions of one or more similarity join processes.

Figure 1:
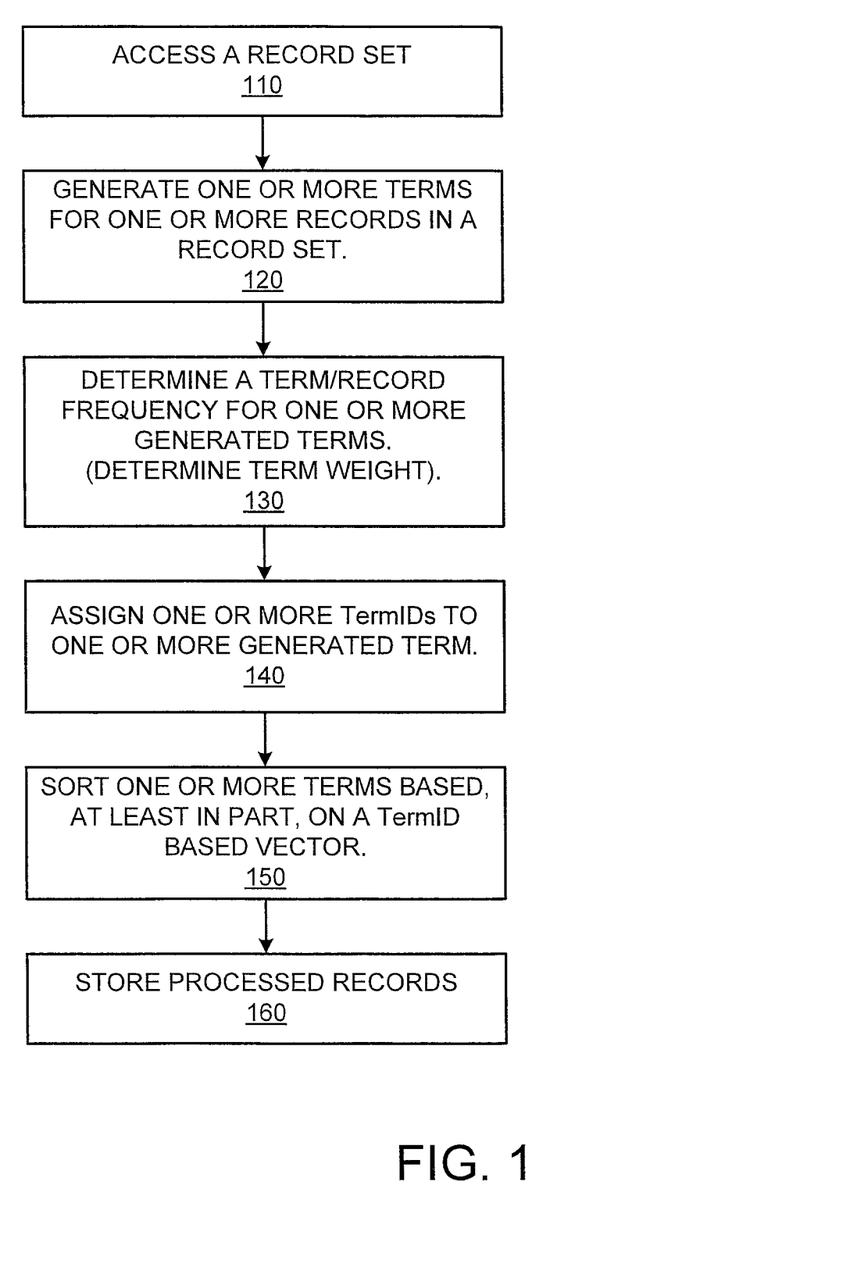
FIG. 1 is a flow chart depicting an exemplary embodiment of a method for processing records for use in determining information similarity.

FIG. 1. illustrates an exemplary embodiment of a process 100 that may be used in an information similarity determination process capable of being operated or implemented in a distributed computing environment. By way of example but not limitation, process 100 depicts processing records for an information similarity determination process which may use one or more similarity functions based on text similarity. Here, for example, suppose that similarity join is used to compare text records from a record set. To illustrate, assume a record set contains two records to be compared: record one may contain business names and business addresses and record two may contain business names and business phone numbers. Thus, a similarity join may be used for information integration (e.g., to form a composite database by matching business names, business addresses, and business phone numbers), as just an example. Of course, this is merely an example for illustrative purposes and the scope of claimed subject matter is not limited in any way.

With regard to process 100, at block 110 a record set to be compared may be accessed. Here, for example, one or more digital electronic signals representing information in one or more records in a record set whose information similarity may be determined, such as by a similarity join process, may be received or otherwise accessed from memory for processing. In other example embodiments, one or more digital electronic signals representing information in one or more records in a record set may be present in a distributed storage environment, such as on one or more storage mediums associated with one or more networked computing platforms, which may be accessed by one or more computing platforms.

At block 120, processing may include generating one or more digital electronic signals representing one or more terms for one or more records in a record set. While there may be numerous approaches to generate one or more terms for a record set, some exemplary and non-limiting approaches may include one or more processes, such as, parsing records into different segments, generating q-grams, tokenizing, truncating, and/or the like. For example, in an illustration, suppose a business name in record one was "CompanyXYZ". Here, a three character q-gram may create the following terms for this particular business name: Com, omp, mpa, any, nyX, yXY, XYZ.

At block 130, in this exemplary embodiment, processing may include determining one or more digital electronic signals representing one or more parameter frequencies for one or more generated terms. By way of example but not limitation, a parameter frequency may include a term related frequency, a record related frequency, a term/record frequency, and/or the like. A term/record frequency may, for example, represent the frequency that a particular term appears in a record set. For example, as mentioned above, a generated term for Company XYZ may be the term "omp" for example. Thus, in embodiment 100, processing at block 130 may determine the frequency in which the term "omp" appears in a record set. Likewise, processing at block 130 may determine the frequency in which the terms Com, mpa, any, nyX, yXY, and XYZ appear in a record set, as just some examples.

At block 140, processing may include assigning one or more termIDs to one or more terms. For example, one or more digital electronic signals representing a particular termID may be assigned to a particular term, where a termID for that particular term is based, at least in part, on a parameter frequency associated with that particular term. For example, in an exemplary embodiment, termIDs may be assigned to terms based on their respective term/record frequency, such that a term with the lowest term/record frequency is assigned a lowest ID, a term with the highest term/record frequency is assigned a highest ID, and one or more terms with intermediate term/record frequencies are assigned termIDs reflecting their respective term/record frequencies. To illustrate, suppose the following terms are associated with the following term/record frequencies (in parenthesis): Com (10), omp (30), and mpa (20). Here, Com may be assigned termID-1, omp may be assigned a termID-3, and mpa may be assigned termID-2, as just an example.

In process 100, if termIDs have been assigned, terms may be sorted based, at least in part, on their assigned termIDs (e.g., sorted by a termID based vector) at block 150. For example, in certain embodiments, one or more digital electronic signals representing terms may be sorted in increasing order of frequency of terms across a record set. Accordingly, terms that are present in more records may appear towards the end of a record. Thus, using the above illustration, termID-1 may be first in a record, termID-2 may be next in a record and termID-3 may be last in a record, as just an example.

In certain exemplary embodiments, terms may be sorted by their respective term/record frequencies prior to being assigned termIDs. For example, in certain exemplary embodiments, terms may be sorted in increasing order of frequency of terms across a record set. Thus, terms with higher term/record frequencies may appear toward the end of a record. To illustrate, using terms in the above illustration, the terms Com (10), omp (30), and mpa (20) may be sorted such that Com (10) may be first, mpa (20) may be next, and omp (30) may be last. Here, terms may then be assigned termIDs based, at least in part, on their sorted order.

In certain embodiments, processing may include determining one or more digital electronic signals representing a term weight, such as at block 130. Term weight, for example, may be a technique which may account more accurately for a significance of particular terms, such as by increasing a value (e.g., a higher term weight) associated with a "rare" term, or by decreasing a value (e.g., a lower term weight) associated with a common term, such as "the" "an" "a" or the like, as non-limiting examples. Of course, there may be numerous techniques to compute a term weight and the scope of claimed subject matter is not limited to a particular technique. Some sample techniques, however, may include multiplying a term/record frequency associated with a particular term with a log of the inverse of the record frequency of the term; determining a term weight as a function of its term/frequency; or, determining a normalized term weight, as non-limiting examples. To illustrate the normalized term weight technique, as just an example, suppose a record contains twenty terms and a particular term appears ten times. Here, this particular term may be receive a term weight of 0.5 (e.g., a weight of ten divided by twenty) as just an example. In certain embodiments, a maximum weight for a particular term for a record set may be determined.

Also, in certain embodiments, parameter frequency for a particular term may reflect a term weight for that particular term. In other words, for example, in certain embodiments a term/record frequency may be a weighted term/record frequency. Accordingly, in certain embodiments, weighted term/record frequencies may be used in performing one or more of the techniques mentioned herein, such as to sort or assign termIDs, as a non-limiting example. In certain embodiments, a term weight may be determined which may not affect a parameter frequency. In such case, for example, a term weight may be stored for later use, such as for use in a similarity join process, as just an example.

In certain exemplary embodiments, terms, termIDs, parameter frequencies, and/or term weights may be stored using one or more digital electronic signals representing in memory or other like storage mechanism for a record set, which may be used by a similarity join or other like information similarity determination process. By way of example, at block 160, one or more digital electronic signals representing processed records may be stored, or otherwise be accessible, for similarity join processing in a distributed computing environment.

Figure 2:
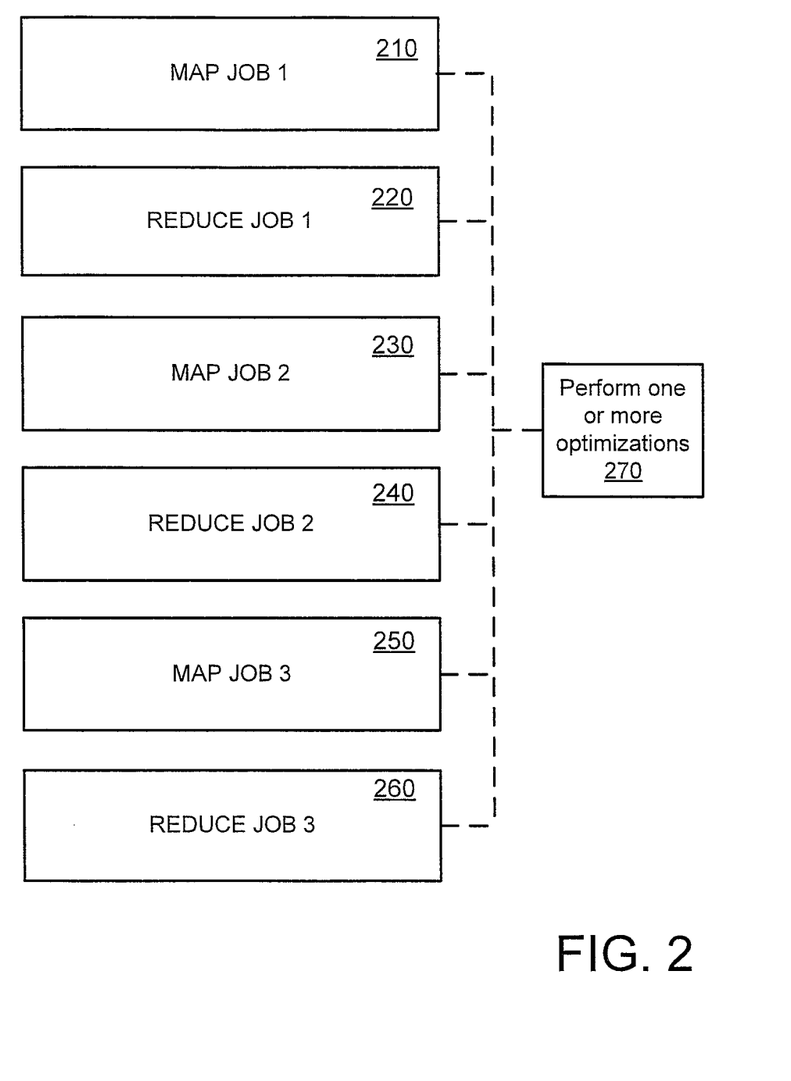
FIG. 2 is a flow chart depicting an exemplary embodiment of a method for determining information similarity in a distributed computing environment.

FIG. 2 depicts a process 200 of an example method that may be employed for operating and/or implementing an information similarity determination process in a distributed computing environment.

It should be noted here that there may be numerous ways to perform an information similarity determination process, which may take various factors into account or be performed over one or more iterations. Here, for illustrative purposes, process 200 depicts a similarity join process which may use one or more similarity functions based, at least in part, on overlap coefficient similarity or vector dot product. Of course, this is merely an example of types of an information similarity determination process which may be performed; accordingly, it is understood that the scope of claimed subject matter is not limited in this regard. For instance, an information similarity determination process operating in a distributed computing environment may be performed where a threshold on similarity may be generalized to thresholds on set overlap coefficient or vector dot product, as non-limiting examples. Furthermore, where a threshold on similarity may be based on approaches other than set overlap coefficient or vector dot product, there may be ways to convert that threshold to a threshold based on set overlap coefficient or vector dot product such that it may operate or be implemented in a distributed computing environment.

To illustrate by way of further example, there may be numerous ways in which thresholds on various similarity functions, such as text similarity functions like edit similarity, jaccard similarity, generalized edit similarity, hamming distance, soundex and similarity based on co-occurrences, may be converted to a threshold on set overlap coefficient, for example. Some of these approaches are discussed in more detail in a publication by Surajit Chaudhuri, Venkatesh Ganti, Raghav Kaushik, entitled "A Primitive Operator for Similarity Joins in Data Cleaning" (Proceedings of the 22nd International Conference on Data Engineering, p. 5, Apr. 3-7, 2006).

In addition, there may be various ways to convert thresholds on similarity functions like cosine similarity, jaccard similarity, dice similarity and overlap coefficient, to thresholds based on dot product of vectors, such as those described in a publication by Bayardo, R. J., Ma, Y., and Srikant, R., entitled "Scaling up all pairs similarity search" (In Proceedings of the 16th international Conference on World Wide Web (Banff, Alberta, Canada, May 8-12, 2007). WWW '07. ACM, New York, N.Y., 131-140). Accordingly, in certain embodiments, if a threshold on similarity is based, at least in part, on approaches other than set overlap coefficient or vector dot product, one or more of the various approaches described by the above-referenced documents may be used, as just an example.

Process 200 depicts, for example, implementing or operating a similarity join process in a distributed computing environment, such as in a map/reduce framework. As with similarity join, there may be numerous approaches to performing operations in a map/reduce framework. In certain embodiments, for example, a similarity join process may be operated or implemented in a Hadoop map/reduce framework over one or more map jobs and/or one or more reduce jobs, as just an example. Since processing via a map/reduce framework may be performed in numerous ways, using various processes, structures, and/or the like, it is understood that claimed subject matter is not to be limited to any particular map/reduce approach. Also, so as to not obscure claimed subject matter, many of the details of various map/reduce operations have been omitted. Accordingly, some details of map/reduce processing may be found in the following publication by Jeffrey Dean and Sanjay Ghemawat, entitled "MapReduce: simplified data processing on large clusters" (Proceedings of the 6th conference on Symposium on Operating Systems Design & Implementation, p. 10-10, Dec. 6-8, 2004, San Francisco, Calif.).

In process 200, a similarity join process is depicted operating in a map/reduce framework via three map/reduce iterations. For instance, in certain exemplary embodiments, at block 210, a first map job (e.g., map job one) may access or receive one or more digital electronic signals representing processed records, such as a portion of the records stored at block 160 in FIG. 1, for example. In certain embodiments, one or more digital electronic signals representing processed records may be distributed among a plurality of mappers, such as being distributed by a battle mapper to a plurality of mappers, which may perform one or more map jobs so that records may be processed in parallel, for example. Also, in certain embodiments, a map job may process only one record at a time (e.g., some map jobs may not compare records).

If a similarity join technique may be based, at least in part, on overlap coefficient similarity, one or more digital electronic signals representing records accessed at block 210 may contain a key which may identify records in which their respective value may be a sequence of termIDs. Alternatively, if a dot product based similarity join technique may be used, one or more digital electronic signals representing record values may be a sequence of pairs of termIDs and term weights, as just an example. In certain embodiments, one or more digital electronic signals representing a hashmap of termIDs to a maximum term weight of each term across all records may be accessed or determined for use in map job one. In addition, one or more digital electronic signals representing a threshold value for similarity may be accessed or received as a parameter to map job one.

At block 210, in certain embodiments, map job one may iterate over the one or more digital electronic signals representing records to compute a prefix and suffix for one or more records. Here, map job one may iterate over the term list, such as from the end to the beginning, filter away a suffix of the term list, and emit only terms in the prefix, as just an example. Also, at block 210, one or more digital electronic signals representing a boundary for a prefix may be computed by map job one, such as by using a technique described in "Efficient similarity joins for near duplicate detection" by Xiao, C., Wang, W., Lin, X., and Yu, J. X., (In Proceeding of the 17th international Conference on World Wide Web (Beijing, China, Apr. 21-25, 2008) WWW '08. ACM, New York, N.Y., 131-140) or by a technique described by "A Primitive Operator for Similarity Joins in Data Cleaning" by Surajit Chaudhuri, Venkatesh Ganti, and Raghav Kaushik (Proceedings of the 22nd International Conference on Data Engineering, p. 5, Apr. 3-7, 2006), as just some examples. For example, for dot product based similarity, map job one may use one or more digital electronic signals representing the hashmap of termIDs to a max weight to compute the prefix boundary.

Also, at block 210, in certain embodiments, map job one may process one or more digital electronic signals representing records to compute statistics about the records which may be used in one or more map/reduce iterations or by one or more optimizations. While the types of statistics about the records may differ depending, at least in part, on the types of optimizations which may be performed, some sample statistics may include, for example: determining a length of a record, or a number of non-zero terms in the record, a length of the suffix, a position in sorted order for one or more terms, a maximum term weight in a record, a maximum term weight in a suffix, or numerous other statistics. In certain embodiments, one or more optimizations may rely on statistics of the record instead of using the record. Thus, one or more digital electronic signals representing statistics emitted by map job one may be carried forward to one or more additional map or reduce jobs in later stages, for example.

At block 210, an exemplary output of map job one may include one or more digital electronic signals representing at least one record for a term present in a prefix of a record. In certain embodiments, a key of an output record may be the termID. For example, in case of dot product based similarity, an exemplary format of the output record may be "termid termweight R.key cached_statistics" and, in case of overlap coefficient, an exemplary format of the output record may be "termid R.key cached_statistics" as just some examples. In certain embodiments, if a term weight is not present in a record, an output may ignore term weight but include the rest.

At block 220, in certain embodiments, reduce job one may receive one or more digital electronic signals representing records associated with termIDs as the key. In certain embodiments, each termID may be mapped to only one of the reducers. Of course, this may not be the case in other embodiments. At block 220, one or more digital electronic signals representing one or more records received by a reducer may be sorted by termID; thus, here, a reducer may iterate over records grouped by a termID. In addition, one or more digital electronic signals representing a threshold value for similarity may be accessed or received as a parameter to reduce job one.

To illustrate, in certain embodiments, one or more digital electronic signals representing a termID may be hashed into a particular directory. Here, one or more reducers may receive one or more digital electronic signals representing records based on a hash value which may have been determined based, at least in part, on one or more digital electronic signals representing a termID. To illustrate, assume, for example, two records exist with the same term "apple" which both are associated with termID 1. If these records are processed by separate mappers, or the same mapper, a mapper may emit records as follows: termID 1/record A, and TermID 1/record B. Thus, in certain embodiments, records with the same termID may go to the same reducer.

In certain embodiments, a reducer may produce one or more digital electronic signals representing an output which may be a cross product of one or more digital electronic signals representing records belonging to a plurality of tables, such as a cross product of records belonging to a table r and a table s, as just an example. To illustrate, a cross product may be determined by a reducer by determining a partial overlap count or partial dot product over one or more matching termID pairs. In certain embodiments, however, a reducer may not produce an output. For instance, no output may be produced if records belong to only one of the two tables, as just an example.

Also, at block 220, one or more optimizations capable of pruning matches between records, such as based on statistics of the records, may be used. For example, one optimization which may be used may be record one or more digital electronic signals representing size based pruning, such as by using a technique described by the publication entitled "Efficient similarity joins for near duplicate detection", which was mentioned previously.

To illustrate one approach, one or more digital electronic signals representing statistics used in one optimization may be similar for at least some terms in the records r and s; thus, a determination of the candidate pairs out of r and s may be ignored for all similar terms in their prefix. Hence, such example optimization may reduce the number of false positives in candidate pairs, which may speed up computation of one or more map or reduce jobs. Of course, record size based pruning is merely one exemplary optimization that may be used here; it may be possible, however, to perform various optimizations in this reduce step, such as performing optimizations where various statistics may be computed by map job one and accessible in the records output by the map job, for example.

In certain embodiments, reduce job one may be capable of determining one or more digital electronic signals representing a partial overlap count or dot product for one or more records. Alternatively, in certain embodiments, reduce job one may not determine partial overlap count or dot product for one or more records. For example, statistics about a number of terms in a record, or a max term weight for a record, such as may have been determined in block 210, for example, may be used; thus, a determination of overlap count or partial dot product of one or more record pairs may not be determined or may be ignored.

In certain embodiments, one or more digital electronic signals representing one or more candidate pairs may be generated by reduce job one. Here, candidate pairs may meet certain conditions to be generated. As just one example, in a case of overlap coefficient, candidate pairs may meet the following exemplary similarity condition: $|r|>=t^*|s|$ and $|s|>=t^*|r|$ to be generated, where "t" represents a threshold value. As another example, in a case of dot product based similarity, exemplary similarity condition $|r|>=t/\max\_term\_weight(s)$ and $|s|>=t/\max\_term\_weight(r)$ may be satisfied. Here, in this example, $|r|$ and $|s|$ may be sizes (a "size" of a vector may be the number of unique terms in a vector) associated with records and max_term_weight(r) and max_term_weight(s) may be the maximum term weights in records r and s, respectively. In certain embodiments, records pairs, such as record pair r,s, for example, may not be included in the candidate pairs if one or more of the conditions, such as the exemplary conditions listed above, are not satisfied.

At block 220, in certain embodiments, an output of reduce job one may reorder one or more digital electronic signals representing record attributes. For example, here, one or more digital electronic signals representing a new key may be created for the output records by combining the keys R.key and S.key with some delimiter. In certain embodiments, a key may be included with a partial dot product score, termID and cached statistics. To illustrate, for overlap coefficient similarity, a partial dot product score may be replaced by "1" which may indicate an overlap count of 1, as just an example. In certain embodiments, an exemplary format of an output record, in case of dot product based similarity, may be "R.key#S.key partial_dotprod termid cached_stats" and, in case of overlap coefficient, an exemplary format of an output record may be "R.key#S.key overlap_count termid cached_stats" as just some examples.

At block 230, one or more map jobs may receive one or more records from reduce job 1. As depicted in process 200, map job two may receive or otherwise access one or more digital electronic signals representing records from reduce job one, which it may emit as an output without any modification. Here, for example, a key for the records emitted by map job two may be a combination of the recordids of the candidate pairs, such as R.key or S.key, as just an example. To illustrate, in certain embodiments, an exemplary format of an output record, in case of dot product based similarity, may be "recordid_x#recordid_y partial_dotprod termid cached_stats" and, in case of overlap coefficient, an exemplary format of an output record may be "recordid_x#recordid_y overlap_count termid cached_stats" as just some examples.

At block 240, one or more reducers may receive one or more digital electronic signals representing one or more records grouped by the key (e.g., recordid candidate pair). In certain embodiments, a reducer may process records to output recordids that form candidate pairs, along with information that may be used in various optimizations, such as filtering based, at least in part, on soft functional dependencies. To illustrate, in certain embodiments, a reduce job two depicted at block 240 may sum one or more digital electronic signals representing a partial dot product or a overlap count. Here, for each candidate pair, reduce job two may compute one or more digital electronic signals representing a dot product or an overlap of the prefixes, as just an example. Also, reduce job two may use the cached statistics available for a candidate pair to compute one or more digital electronic signals representing an upper bound on the dot product or the overlap.

Upper bounds on a similarity of prefixes or suffixes of candidate pairs may be used for pruning. One technique for pruning based on upper bounds, for example, which may be used is described by the publication entitled, "Scaling up all pairs similarity search" which was mentioned previously. In addition, this approached may be further modified by indexing one or more digital electronic signals representing term positions in an index, such as described by the publication entitled, "Efficient similarity joins for near duplicate detection" also mentioned previously. In certain embodiments, one or more digital electronic signals representing an overlap or dot product of a prefix may already be aggregated in reduce job two. Here, one or more digital electronic signals representing term position based upper bound may not be used; instead, an upper bound may be set based, at least in part, on a size of the suffix.

Also, in certain embodiments, a technique referred to as "summary statistics", which is described in more detail below, may be utilized for pruning based, at least in part, on bounds of candidate pairs. Of course, as mentioned previously, these optimizations are merely examples of optimizations which may be used in certain embodiments; accordingly, the scope of claimed subject matter is not to be limited in this regard.

In certain embodiments, at block 240, one or more reduce jobs may output recordids that form candidate pairs, along with information that may be used in various optimizations. In certain embodiments, an exemplary format of an output record, in case of dot product based similarity, may be "recordid_x recordid_y prefix_dotprod bound_suffix cached_stats" and, in case of overlap coefficient, an exemplary format of an output record may be "recordid_x recordid_y prefix_overlap bound_suffix cached_stats" as just some examples.

At block 250, one or more map jobs may receive one or more digital electronic signals representing records processed by a reduce job, such as reduce job two. Here, map job three at block 250 may be capable of processing one or more digital electronic signals representing one or more records received from reduce job two based, at least in part, on one or more soft functional dependency rules. In general, one definition of a soft functional dependency rules may be found in the above mentioned publication, entitled "A Primitive Operator for Similarity Joins in Data Cleaning."

In certain embodiments, a table on which the soft functional dependency rule may be based may be selected by map job three at block 250, for example, to generate one or more digital electronic signals representing keys for the records to be emitted. Here, a map job at block 250 may iterates over one or more digital electronic signals representing the records to identify a recordid that may be used as a key for a next reduce job, such as reduce job three, for example. In certain embodiments, map job three may processes one or more recordids to create a key and rearrange the record to create an output record. Here, contextual problems in record linkage and information cleaning might place certain constraints on the candidate pairs based on soft functional dependencies. For instance, in an information cleaning context for web based advertisements, functional dependencies may be based, at least in part, on one or more digital electronic signals representing a table containing web data, for example. Web data may be contained in a table, such as table R, for example, with the keys created by a combination of page URL and unique XPATH. However, here in this context, functional dependencies may be at the page level. Thus, map job three may identify the recordid from table R and separate it into page URL and XPATH, as just an example. Here, a page URL may be used as the key for a reduce job. Also, in this context, an XPATH may be stored separately as an attribute in the output record. Also, in certain embodiments, map job three may separate the key from a table into actual recordids, or attribute name, and store one or more digital electronic signals representing the attribute name as a separate attribute, as just an example.

For instance, an exemplary output of reduce job two may be a record stored as the following: "http://www.pageurl.com/url.html#/html/body/table/tr/td###newsrecid1234#title cached_statistics". Here, at block 250, a map job three may process one or more digital electronic signals representing this record and convert it to one or more digital electronic signals representing the following exemplary format: "http://www.pageurl.com/url.html newsrecid1234/html/body/table/tr/td title cached_statistics". Of course, this is merely one example of one way, and one context, where map job three may produce a particular format of an output record. Accordingly, the scope of claimed subject matter is not to be limited in any way. As just another example, map job three may produce an output record with the following exemplary format: "key_record_r key_record_s other attributes and_stats".

At block 260, one or more digital electronic signals representing one or more output records may be received by one or more reduce jobs. Here, for example, one or more digital electronic signals representing output records from map job three may be received or otherwise accessed by reduce job three. In certain embodiments, a reduce job three at block 260 may group output records by one or more digital electronic signals representing the key generated by map job three.

Here, reduce job three may apply one or more functional dependency rules on matches for one or more keys. To illustrate using the information cleaning example herein, one or more digital electronic signals representing records may be grouped by the page URL. In certain embodiments, for one or more page URLs, a reducer may check the matches to records from table S. Here, a record from S may be retained as a candidate pair if at least one of a title attribute, abstract attribute, or content attribute, may be matched into some XPATH of the page, as just an example. One or more candidate pairs which may not satisfy this condition may be discarded. In certain embodiments, an output of reduce job three may be one or more digital electronic signals representing a final set of candidate pairs.

For illustrative purposes, some of the examples mentioned herein refer to performing similairy join to compare one or more records from two tables. Of course, again, these are merely examples of types of operations which may be performed as part of an information similarity determination process in a distributed computing environment; accordingly, the scope of claimed subject matter is not to be limited to any examples or illustrations.

As just one further example, in certain embodiments, one or more operations described herein may be performed for self joins. For instance, in certain embodiments, a copy of one or more digital electronic signals representing a record set may be made, such as at operation 160 in FIG. 1, for example, which may make a self join computation feasible. Also, in certain embodiments, one or more of the techniques described herein may be combined into an operator for similarity join based, at least in part, on a technique described in a publication entitled, in "Pig latin: a not-so-foreign language for data processing" by Olston, C., Reed, B., Srivastava, U., Kumar, R., and Tomkins, A. ((2008) In Proceedings of the 2008 ACM SIGMOD international Conference on Management of Data (Vancouver, Canada, Jun. 9-12, 2008). SIGMOD '08. ACM, New York, N.Y.), as just an example.

At block 270, in certain embodiments, one or more optimizations may be utilized by one or more map jobs or reduce jobs, for example, to reduce the number of records to compare, prune final candidate pairs, and/or the like. Block 270, for example, depicts that various optimizations may be performed at various times throughout a map/reduce process (e.g., represented by the dashed line from block 270 to various map/reduce operations).

For instance, in certain embodiments, a prefix filter optimization may be utilized first in a similarity join process. A prefix filer optimization may reduce the computation time of later stages; also, it may reduce the number of candidate pairs generated by using a prefix, for example. In certain embodiments, a record size pruning optimization may operate next to reduce the number of candidate pairs, such as by ignoring a match between pairs that may not meet a record size relation criterion. An upper bound optimization may be utilized to compute an upper bound on a similarity between candidate pairs, where it may prunes pairs whose upper bound may be less than a threshold value. Of course, these are merely examples of optimizations which may be used, and examples of various times at which they may be used, in one or more exemplary operations. Accordingly, these examples do not limit the scope of claimed subject matter.

Furthermore, in addition to some of the optimizations mentioned previously, various other optimizations may be used at various times throughout an information similarity determination process. While by no means a comprehensive list of optimizations, listed herein are some exemplary optimizations which may be performed at various times in a similarity join process, such as at one or more map or reduce jobs, for example. Implementation details of many of these optimizations may be found in one or more publications mentioned previously, or in one or more of the following publications: "Efficient exact set-similarity joins", by Arvind Arasu, Venkatesh Ganti, and Raghav Kaushik (Proceedings of the 32nd international conference on Very large data bases, Sep. 12-15, 2006, Seoul, Korea); "Efficient set joins on similarity predicates" by Sunita Sarawagi and Alok Kirpal (Proceedings of the 2004 ACM SIGMOD international conference on Management of data, Jun. 13-18, 2004, Paris, France); "Optimization strategies for complex queries" by Trevor Strohman, Howard Turtle, and W. Bruce Croft (Proceedings of the 28th annual international ACM SIGIR conference on Research and development in information retrieval, Aug. 15-19, 2005, Salvador, Brazil); and, "Query evaluation: strategies and optimizations" by Howard Turtle and James Flood (Information Processing and Management, an International Journal, v. 31 n. 6, p. 831-850, November 1995).

As mentioned above, one sample optimization may include prefix filtering. Prefix filtering may use one or more digital electronic signals representing threshold criterion to choose only a part of the record for indexing. Prefix filtering may reduce the number of candidate pairs whose similarity is less than the threshold. Depending on how it is performed, it may operate in similar fashion in case of similarity based, at least in part, on overlap or dot product. For example, in case of overlap coefficient, other than indexing the prefix, in certain instances only a prefix may be used for a lookup into the index, as just an example. It may be possible to employ a similar operation which tracks the maximum possible dot product during index lookup and which may not add new candidates if a maximum possible dot product may be less than threshold, as just an example.

Yet another optimization, termed "record size based pruning" may be used. Record size based pruning may describes a relation, such as in the context of dot product, between the sizes of the candidate vectors, which if not satisfied may determine that the similarity of the prefixes may not be computed. It may be possible to employ a similar optimization for pruning in the context of overlap coefficient, for example.

Yet another optimization based, at least in part, on an upper bound on similarity of a suffix may be used. Here, it may be possible to employ a technique which uses an upper bound on the dot product of suffixes of candidate pairs to prune candidate pairs. Such optimization may be adjusted by indexing one or more term positions in the index, for example.

Yet another optimization may be to use a single pass probe technique. In this technique, for example, indexing and candidate pair generation phases may be combined into a single scan of the data. Here, one or more digital electronic signals representing records may be ordered based, at least in part, on some criteria, such as length or max weight in a record, for example. Thus, for each new record, index lookup may be performed in the current index to generate the candidate pairs. Then, one or more digital electronic signals representing a prefix of the current record may be added to the index. Generally, this optimization tends to be used in the case of self joins; thus, it may not be as useful if similarity join between two different tables is desired.

In yet another example optimization, one or more digital electronic signals representing records may be processed in decreasing order of length. This optimization may be used in case of similarity based on overlap, for example. Here, processing longer records first may reduce the amount of time spent in an index lookup for longer records. As with a single pass probe technique, may not be useful if similarity join between two different tables is desired.

In yet another optimization, a prefix filtering optimization, such as described previously, may use max_row_weight. Here, records may be sorted in decreasing order of max_row_weight, which may be a maximum weight of any term in a record. This sorted order may be used to reduce a length of the prefix indexed even further. As with a single pass probe technique, this optimization may not be useful if similarity join between two different tables is desired.

Yet another optimization, termed "suffix filter", may employ an optimization which prunes candidate pairs by computing bounds on hamming distance of the suffixes. Here, for each candidate pair this optimization may use multiple binary searches performed on the suffixes. Generally, to perform binary search on the suffix, the suffix may be loaded in memory or read from a disk, for example. If read from a disk, a merge may be performed (e.g., similar to a merge operation in merge-sort) to compute an overlap of the suffix pairs. Here it may be desirable to have suffixes sorted on a disk or other like storage mechanism in order.

Yet another optimization, one or more digital electronic signals representing similar records with a large overlap may be clustered. Here, clusterIDs may be stored in the index for all terms in clusters. This optimization may reduce the index size and, hence, the computation required for lookup in the index. This optimization may also use parameters that determine when clusters are created and when a record may be added to a cluster. Also, it may update an index if one or more new clusters are created, as just some examples.

Figure 3:
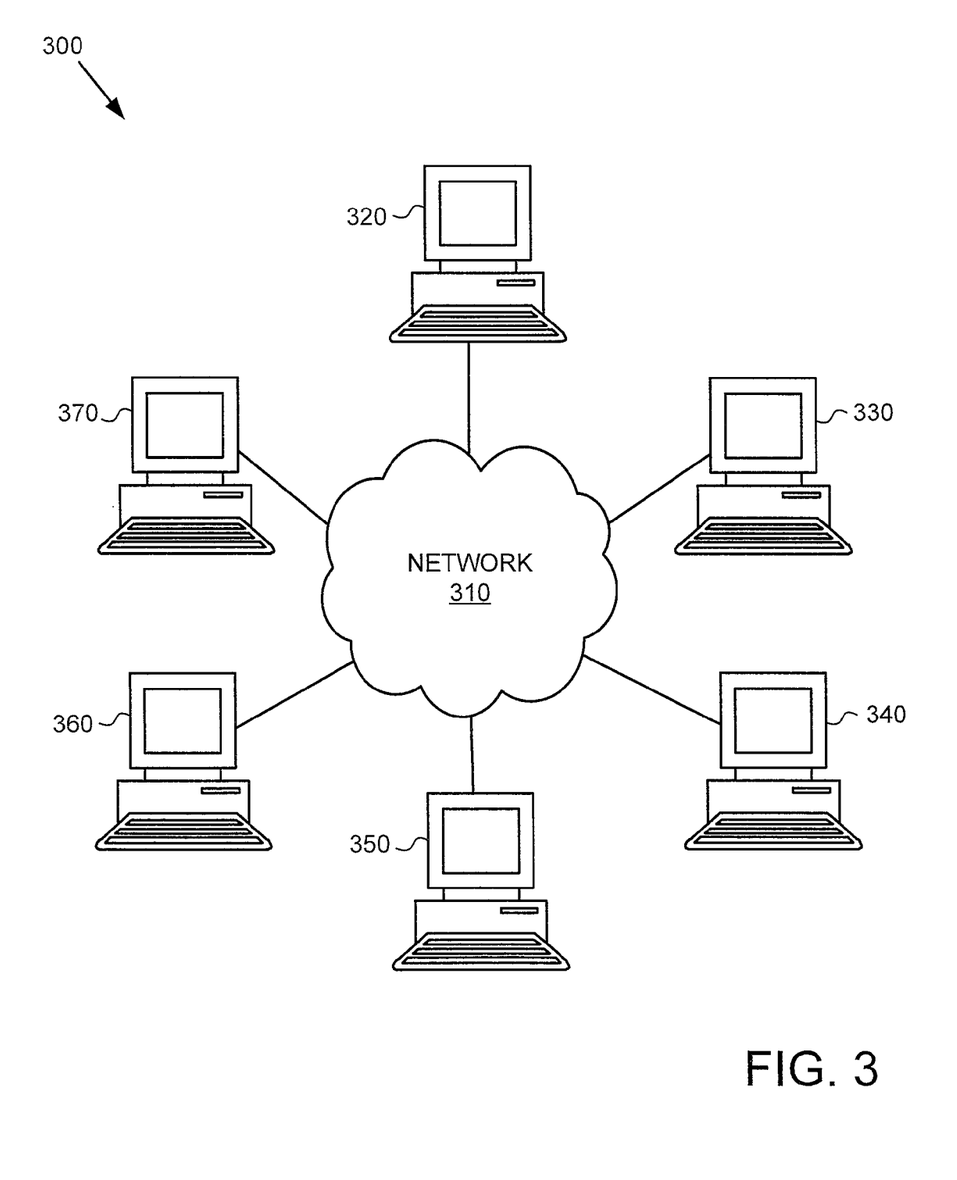
FIG. 3 is a schematic diagram depicting an exemplary embodiment of a system to determine information similarity in a distributed computing environment.

FIG. 3. is a schematic diagram depicting an exemplary system 300 that may be used to operate or implement an information similarity determination process in a distributed computing environment. In system 300, computing platforms 320-370 may be communicatively coupled to at least one network 310. Here, in this example, computing platform 320 may perform one or more operations depicted in FIG. 1, for example. Accordingly, in certain embodiments, computing platform 320 may access one or more digital electronic signals representing one or more records for processing, generate one or more digital electronic signals representing one or more terms, determine one or more digital electronic signals representing a parameter frequency, or assign one or more digital electronic signals representing one or more termIDs to one or more terms, as non-limiting examples. Of course, in certain embodiments, one or more operations which may be performed by computing platform 320 in system 300, such as operations depicted in FIG. 1, for example, may be performed, at least in part, by one or more computing platforms 330-370 communicatively coupled via network 310, as just an example.

In certain embodiments, at least one computing platform coupled to a network of computing platforms may be termed a "battle mapper." Here, for ease of illustration, computing platform 320 may be depicted as a battle mapper. In certain embodiments, processing in a distributed computing environment, such as may be performed in a map/reduce framework, may be coordinated by a battle mapper. Here, in system 300, a battle mapper may be capable of distributing or transmitting records to be processed in a map/reduce framework among a plurality of computing platforms. In certain embodiments, two or more computing platforms may be capable of processing records in parallel, at least in part.

In system 300, battle mapper 320 may store one or more digital electronic signals representing one or more processed records, such as stored processed records 160 at FIG. 1. Of course, battle mapper 320 may access one or more digital electronic signals representing processed records from one or more other computing platforms, such as computing platforms 330-370. In certain embodiments, one or more digital electronic signals representing records to be processed in a map/reduce framework may be present in a common location for input into a first map job.

Here, battle mapper 320 may group one or more digital electronic signals representing records into two or more groups which may be distributed or accessed by at least two or more computing platforms, for example. Computing platforms 330-370, for example, may access or receive one or more digital electronic signals representing at least a portion of the processed records from battle mapper 320. In system 300, computing platforms 320-370 may perform one or more operations depicted in FIG. 2. For example, in certain embodiments, computing platforms 320-370 may be capable of performing one or more map jobs, or one or more reduce job functions. In addition, computing platforms 320-370 may be capable of performing one or more optimizations, such as one or more optimizations described herein.

In certain embodiments, one or more digital electronic signals representing inputs or outputs of one or more operations performed by one or more networked computing platforms, such as platforms 320-370, may be transmitted, received, or otherwise accessed by one or more other networked computing platforms. Accordingly, in certain embodiments, any particular computing platform may perform at least some portion of one or more map jobs, one or more reduce jobs, or one or more optimizations, as non-limiting examples. In certain embodiments, one or more digital electronic signals representing final candidate pair outputs performed by a plurality of networked computing platforms may be transmitted to a battle mapper, such as battle mapper 320, for example. Of course, these are merely examples of claimed subject matter; as such, they do not limit its scope.

As mentioned previously, one challenge with similarity join may be that it may produce a set of candidate pairs which contain some false positives. Thus, one or more optimizations may be performed for a similarity join technique, some of which were mentioned herein, to prune candidate pairs. While various approaches may exist to prune false positive candidate pairs, some of these approaches may also present challenges of their own. For instance, some approaches may not efficiently or effectively prune candidate pairs to a desirable level.

Accordingly, with these and other concerns in mind, in accordance with certain aspects of the present description, example embodiments or implementations may include methods, systems, or apparatuses to reduce the number of false positives in candidate pairs. For instance, in certain exemplary embodiments, an optimization, previously referred to as "summary statistics", may be performed to reduce a number of candidate pairs by computing one or more digital electronic signals representing an upper bound on an overlap of the prefixes or suffixes, as just an example. Depending on the embodiment, one or more first or last terms of a prefix or suffix may be used by summary statistics; in addition, in various embodiments, higher order summaries, such as median, quartiles, deciles, and/or the like, may be used. In certain embodiments, summary statistics may be performed in a distributed computing environment, such as on two or more computing platforms depicted in FIG. 3, for example, or on a single computing platform, apparatus, or device, as just some examples. Also, summary statistics may be performed for a similarly join technique which may have been performed in or out of a distributed computing environment context.

Figure 4:
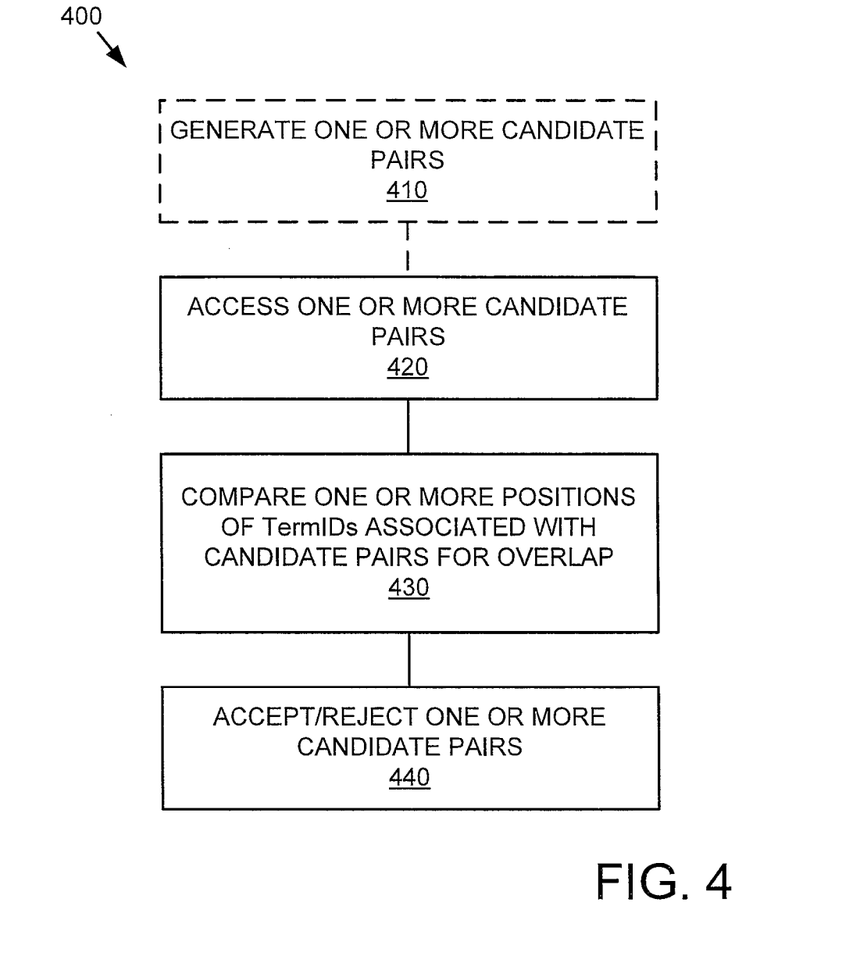
FIG. 4 is a flow chart diagram depicting an exemplary embodiment of a method for performing summary statistics relating to determined information similarity.

FIG. 4 is a flow chart depicting an exemplary process 400 of a method for performing summary statistics. Here, at block 410, one or more digital electronic signals representing one or more candidate pairs may be determined. In certain embodiments, determining one or more digital electronic signals representing one or more candidate pairs may include performing one or more operations depicted in FIG. 1 or FIG. 2. For instance, at block 410, one or more operations may access one or more digital electronic signals representing one or more records for processing, generate one or more terms, determine one or more digital electronic signals representing a parameter frequency, or assign one or more digital electronic signals representing one or more termIDs to one or more terms, as depicted in FIG. 1, as non-limiting examples. Also, at block 410, one or more operations may perform one or more map jobs or one or more reduce jobs, as depicted in FIG. 2, as non-limiting examples. With reference to one or more operations depicted in FIG. 2, in certain embodiments, in contrast to the similarity join technique performed in a distributed computing environment, an operation to determine one or more digital electronic signals representing one or more candidate pairs may be performed out of a distributed computing environment context, such as on a single computing platform or on a specific apparatus, as just an example. Accordingly, in certain embodiments, one or more, or even all, summary statistics operations depicted in FIG. 4 may be performed on a single computing platform or apparatus. Of course, in certain embodiments, one or more digital electronic signals representing one or more candidate pairs may have been determined already, such as by a similarity join process. Thus, here, a summary statistics operation may access one or more candidate pairs, as just an example.

At block 420, one or more digital electronic signals representing one or more candidate pairs may be accessed. In certain embodiments, for example, an operation at block 420 may access one or more digital electronic signals representing candidate pairs from a map or reduce job iteration, such as at reduce job 240, for example. Here, with respect to the candidate pairs, one or more digital electronic signals representing a particular termID may already be assigned to a particular term where a termID for that particular term is based, at least in part, on one or more digital electronic signals representing a term/record frequency associated with that particular term. This may be the case where an operation at block 420 accesses candidate pairs from reduce job 240 in FIG. 2, for example. If, however, a particular termID is not assigned to a particular term based, at least in part, on a term/record frequency, then a summary statistics operation, such as described at block 410, may perform that operation. Thus, in certain embodiments, in one or more techniques mentioned herein, once a sort order has been determined, one or more digital electronic signals representing termIDs may be assigned to terms based on this sorted order. Accordingly, in an embodiment, a term with a smallest term/record frequency may receive a termID 0 and a term with a highest term/record frequency may receive a highest termID, as an example.

At block 430, a summary statistics operation is depicted comparing one or more digital electronic signals representing one or more positions of one or more termIDs between candidates of at least one candidate pair for an overlap. In certain embodiments, for example, a summary statistics operation at block 430 may utilize one or more digital electronic signals representing termIDs associated with candidate pairs to determine upper bounds. For example, summary statistics may use one or more digital electronic signals representing termIDs as indicators of term position in a suffix. To illustrate, an operation at block 430 may be as follows: For two vectors X and Y and their prefix and suffix X_prefix, Y_prefix, X_suffix, Y_suffix, their similarity may be broken up into a similarity between the prefixes and suffixes such that:

$$\text{Similarity}(X, Y) = \text{Prefix} - \text{Prefix Similarity} +$$
$$\text{Prefix} - \text{Suffix Similarity} +$$
$$\text{Suffix} - \text{Suffix Similarity}$$

$$\text{Similarity}(X, Y) = \text{Similarity}(X\_prefix, Y\_prefix) +$$
$$\max(\text{Similarity}(X\_prefix, Y\_suffix),$$
$$\text{Similarity}(X\_suffix, Y\_prefix)) +$$
$$\text{Similarity}(X\_suffix, Y\_suffix).$$

Here, in certain embodiments, a similarity(X_prefix, Y_prefix) may already be determined using a prefix filtering optimization, such as previously described. Thus, among the two similarities between the prefix and suffix, similarity(X_prefix, Y_suffix) and similarity(X_suffix, Y_prefix), one similarity may be zero since only one of the prefix vectors may overlap with the suffix of the other vector, as just an example.

Thus, in certain embodiments, a summary statistics operation may produce one or more digital electronic signals representing an upper bound on a similarity of the suffixes where similarity(X_suffix, Y_suffix), or on a similarity between the prefix of one vector with the suffix of the other vector. To illustrate an exemplary embodiment, an operation at block 430 may use one or more digital electronic signals representing termIDs of a first and last terms of a suffix and/or a last term of the prefix. Here, if two suffixes overlap, then, a first or a last termID of one of the suffixes should lie between a first or a last term ID of the other suffix; otherwise, the suffixes may not overlap. Similarly, a prefix that overlaps with a suffix of the other vector should have a termID of a last term in the prefix which lies between a first or a last term of the suffix, as non-limiting examples.

For sake of illustration, assume X and Y are sorted suffixes and let the termIDs be based, at least in part, on the sort order of terms. Furthermore, assume a first_suffix_x and first_suffix_y are the first terms in suffix X and Y, respectively, last_suffix_x and last_suffix_y are the last terms in the suffix X and Y, respectively, and last_prefix_x and last_prefix_y are the last terms in the prefixes of X and Y, as just an example. Here, |X_suff| and |Y_suff| may be the sizes of the suffixes X and Y, and |X_prefix| and |Y_prefix| are the sizes of the prefixes of X and Y. Based on the above assumptions, one simple but exemplary pseudo code to compute an overlap based on a first and last TermID (e.g., Prefix/Suffix overlap similarity) may be as follows:

Prefix_Overlap=1
If (last_prefix_x>first_suffix_y) then:
   termoverlap=last_prefix_x−first_suffix_y;
   Prefix_Overlap=min(|X_prefix|, |Y_suff|, termoverlap);
If (last_prefix_y>first_suffix_x) then:
   termoverlap=last_prefix_y−first_suffix_x;
   Prefix_Overlap=min(|X_suff|, |Y_prefix|, termoverlap).

Similarly, based on the above assumptions, a simple but exemplary pseudo code to compute an overlap based on a last termIDs (e.g., Suffix/Suffix overlap similarity) may be as follows:

If (first_suff_y>last_suff_x||first_suff_x>last_suff_y) then:
   Suffix_term_Overlap=0;
If   (last_suff_y<=last_suff_x)   then,   if (first_suff_y<first_suff_x) then:
   Suffix_term_Overlap=last_suff_y−first_suff_x, else
   Suffix_term_Overlap=last_suff_y−first_suff_y
If (last_x<=last_y) then, if (first_x<first_y) then:
   Suffix_term_Overlap=last_x−first_y, else
   Suffix_term_Overlap=last_x−first_x.
Thus, Suffix_Overlap=min(|X_suff|,|Y_suff|,Suffix_term_Overlap).

In certain embodiments, an upper bound on similarity of X and Y for overlap based similarity may be as follows: Overlap (X_prefix, Y_prefix)+Prefix_Overlap+Suffix_Overlap. In other embodiments, an upper bound on similarity of X and Y for cosine based similarity may be as follows: Prefix_cosine_similarity+Prefix_Overlap max_term_weight(overlap_prefix) max_term_weight(overlap_suffix)+Suffix_Overlap max_term_weight(X_suffix) max_term_weight(Y_suffix). Here, max_term_weight(overlap_prefix) refers to a maximum term weight in prefix that overlaps with the suffix, max_term_weight(overlap_suffix) refers to a maximum term weight in the suffix that overlaps with the prefix, and, max_term_weight(X_suffix) refers to a maximum term weight in the suffix of the vector X. Of course, the these examples are merely illustrative of claimed subject matter and, accordingly, do not limit the scope of claimed subject matter in any way.

In the illustrations herein, in some instances using only a first and last termID may not achieve a desirable bound on overlap. For instance, a term overlap may be determined as a difference in termIDs which may be greater than a length of a suffix or prefix. For example, assume X_suffix=100, 200, 300 and Y_suffix=50, 199. Here, Suffix_term_Overlap=last_y−first_x=199−100=99. Accordingly, |X_suff|=3 and |Y_suff|=2, which is lesser than Suffix_term_overlap. Therefore, in some instances, a bound on overlap may simplify to min(|X_suff|,|Y_suff|), as just an example.

Thus, in certain embodiments, one or more digital electronic signals representing a median term in a suffix may be included determined a summary statistics operation at block 430, which may improve the upper bound on overlap, or improve the upper bound on overlap based on cosine similarity, for example. For instance, assume for illustrative purposes that X_suffix=100, 200, 300, 400, 500 and Y_suffix=10, 20, 50, 80, 210. Here, x_suff_median=300 and y_suff_median=50. Also, Y_last_suffix=210 is <x_suff_median=300. Thus, a length vector X up to median=2 (e.g. term 100 and 200). Also, Y_suff_median=50 is less than X_first_suffix=100. Thus, a length of vector Y after median and up to Y_last_suffix=2 (e.g. term 80 and 210). Here, the term overlap of Y_last_suffix and X_first_suffix=210−100=110.

In this example, since Y_last_suffix is less than x_suff_median and y_suff_median is greater than X_first_suffix, a more desirable upper bound on overlap may be determined based on median. For instance, in exemplary embodiment, determining an upper bound with median on overlap of X_suffix and Y_suffix for may be as follows: min(termoverlap, length of vector Y after median and up to last_y, length vector X upto median). Thus, applied to the above illustrative terms, overlap of X_suffix and Y_suffix=min(110, 2, 2)=2.

As yet another example of an upper bound with median, suppose a last term of X_prefix was 49. Here, for example, y_suff_median may be used to compute an upper bound on overlap of X_prefix with Y_suffix. For instance, assume X_lastterm_prefix=49, Y_suff_median=50, |X_prefix|=6, and Y_first_suffix=10. Here, termoverlap=X_lastterm_prefix−Y_first_suffix=49−10=39. Thus, an upper bound of overlap of X_prefix with Y_suffix=min(termoverlap, |X_prefix|, length of vector Y up to median)=min(9, 6, 2)=2. Again, these are merely examples of ways in which an upper bound with median may be determined. Accordingly, the scope of claimed subject matter is not to be limited in this respect.

Of course, the exemplary embodiments described herein to compute an upper bound using a summary statistic are merely examples of sample approaches. As suggested above, there are numerous ways to compute upper bound which may include using one or more digital electronic signals representing higher order summaries like termIDs at median, quartiles, deciles, percentiles, or the like. Accordingly, the scope of claimed subject matter is not limited to examples or illustrations. Also, in certain embodiments, a binary search may be utilized at block 430 to identify or determine positions of a first or last term in a suffix in a summary of another suffix, as just an example.

At block 440, one or more operations may accept or reject candidate pairs, such as reject false positive candidate pairs, based, at least in part, on one or more comparisons performed at block 430. In certain embodiments, one or more digital electronic signals representing accepted candidate pairs may continue to be processed via a similarity join technique, such as by being transmitted to, or accessed by, one or more map or reduce operations depicted in FIG. 2, as just an example.

Figure 5:
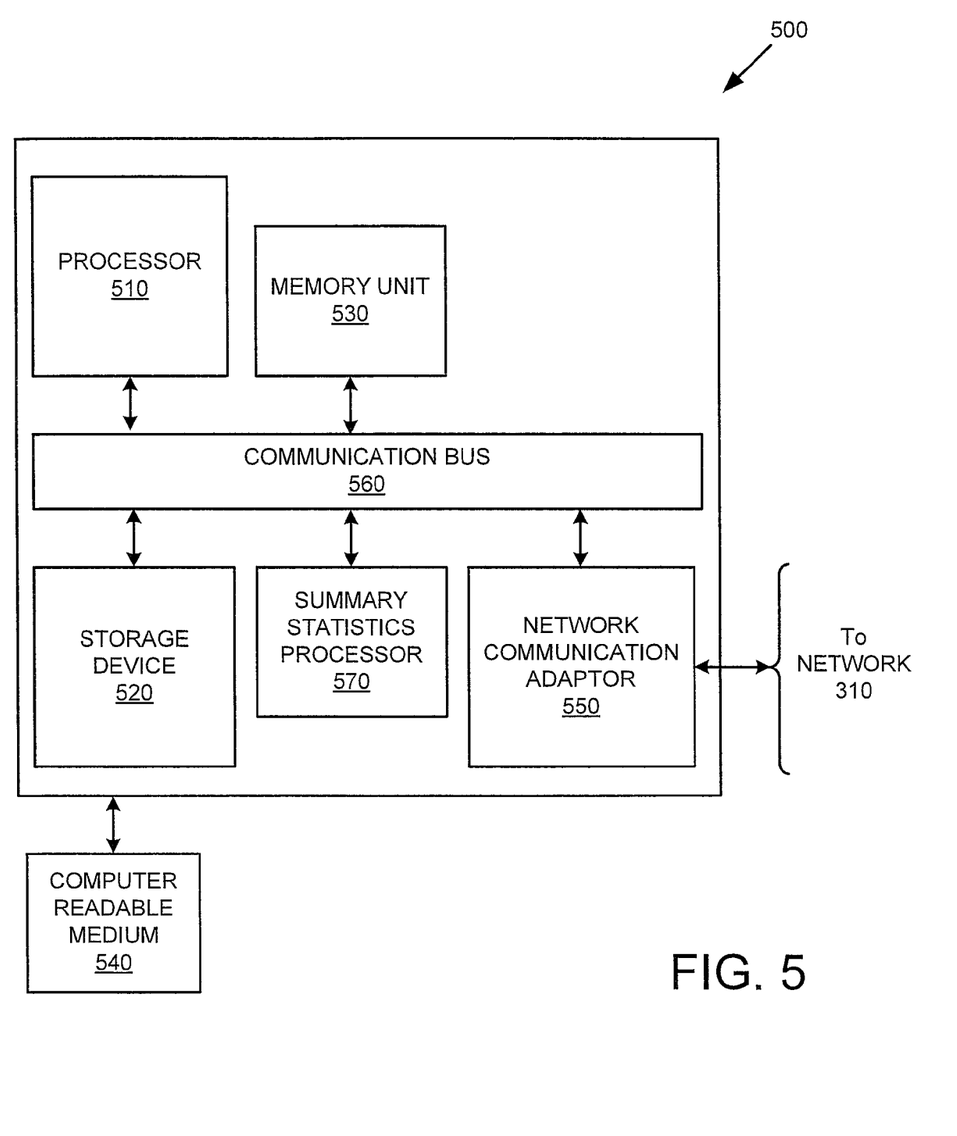
FIG. 5 is a schematic diagram depicting an exemplary embodiment of an apparatus to perform data processing associated with determining information similarity and/or summary statistics relating to determined information similarity.

FIG. 5 is a schematic diagram depicting an exemplary embodiment 500 of an apparatus to perform one or more record processing, information similarity determination, optimization, or summary statistics processes/operations. Here, apparatus 500 may include a special purpose computing platform, such as a specific client device, apparatus, or a general purpose computer once it is programmed to perform particular operations pursuant to instructions from program software, as non-limiting examples. Here, apparatus 500 depicts a special purpose computing platform that may include one or more processors, such as processor 510. Furthermore, apparatus 500 may include one or more memory devices, such as storage device 520, memory unit 530, or computer readable medium 540. In addition, apparatus 500 may include one or more network communication adapters, such as network communication adaptor 550. Apparatus 300 may also include a communication bus, such as communication bus 560, operable to allow one or more connected components to communicate under appropriate circumstances.

In an example embodiment, communication adapter 550 may be operable to receive or transmit one or more digital electronic signals relating to information which may exist from, or be determined at least in part by, one or more operations depicted in FIGS. 1-4, such as by communicating with network 310 in FIG. 3, for example. In addition, as non-limiting examples, communication adapter 550 may be operable to send or receive one or more signals relating to information which may exist from, or be determined at least in part by, one or more operations depicted in FIGS. 1-4.

In an example embodiment, apparatus 500 may be operable to perform one or more operations previously described, such as one or more process depicted in FIG. 1, FIG. 2, or FIG. 4. For instance, apparatus 500 may be operable to access one or more digital electronic signals representing one or more records for processing, generate one or more terms, determine term/record frequency, or assign one or more termIDs to one or more terms, as depicted in FIG. 1, as non-limiting examples. Apparatus 500 may be operable to perform one or more map jobs or one or more reduce jobs, as depicted in FIG. 2, as non-limiting examples. Thus, as just an example, apparatus 500 may be any one of computing platforms 320-370 depicted in FIG. 3. In addition, apparatus 500 may be operable to perform one or more operations depicted in FIG. 4, such as accessing one or more candidate pairs, comparing one or more digital electronic signals representing one or more positions of termIDs associated with candidate pairs for overlap, or accepting or rejecting one or more candidate pairs, as non-liming examples.

Of course, in certain embodiments, one or more operations which may be performed by apparatus 500 may be performed by processor 510. In certain embodiments, however, apparatus 500 may include summary statistics processor 570. Here, summary statistics processor 570 may be a special purpose processor capable of performing one or more operations depicted in FIG. 1 or FIG. 4, as just an example.

In certain embodiments, apparatus 500 may be operable to transmit or receive information relating to, or used by, one or more process or operations, such as one or more processes mentioned previously, via communication adapter 550, computer readable medium 540, and/or have stored some or all of such information on storage device 520, for example. As just an example, computer readable medium 540 may include some form of volatile and/or nonvolatile, removable/non-removable memory, such as an optical or magnetic disk drive, a digital versatile disk, magnetic tape, flash memory, or the like. In certain embodiments, computer readable medium 540 may have stored thereon computer-readable instructions, executable code, and/or other data which may enable a computing platform, such as apparatus 500, to perform one or more processes or operations mentioned previously. Accordingly, in certain embodiments, one or more of the operations mentioned previously may be performed by software, hardware, or the like, or some combination thereof, as just an example. Also, in certain example embodiments, apparatus 500 may be operable to store information relating to, or used by, one or more operations mentioned previously, such as signals relating to one or more records, for example, in memory unit 530 and/or storage device 520.

It should be noted that these are merely illustrative examples and that claimed subject matter is not limited in this regard. For example, information stored or processed, or operations performed, by apparatus 500 may be performed by other components or devices, in whole or in part, depicted or not depicted in FIG. 5. Furthermore, operations performed by components or devices in apparatus 500 may be performed in distributed computing environments, such as depicted by FIG. 3, where one or more operations may be performed by remote processing devices which may be linked via a communication network, as just an example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A method, comprising:
accessing a record set comprising a plurality of records;
generating a plurality of terms for said plurality of records, individual ones of said plurality of terms comprising a q-gram of a fixed character length;
determining a plurality of respective parameter frequencies for said plurality of terms;
at least partially in response to said determining a plurality of respective parameter frequencies, assigning particular termIDs to said plurality of terms based, at least in part, on said respective parameter frequencies, wherein said particular termIDs comprise an identifier to indicate a term/record frequency within said record set;
comparing one or more positions of said termIDs for first terms of a first vector of terms for a first candidate record and for second terms of a second vector of terms for a second candidate record to determine whether there is an overlap between the first and second vectors.

2. The method of claim 1, wherein at least one of said parameter frequencies comprises a term/record frequency.

3. The method of claim 1, wherein said record set comprises at least two tables of records.

4. The method of claim 1, wherein generating said plurality of terms for one or more records comprises using at least one of a parsing technique, a q-grams technique, a tokenizing technique, a truncating technique, or combinations thereof.

5. The method of claim 1, wherein assigning said particular termIDs to said plurality of terms comprises at least one of:
assigning a lowest termID to a term associated with a lowest respective term/record frequency; and/or
assigning a highest termID to a term associated with a highest respective term/record frequency.

6. The method of claim 1, further comprising:
determining a term weight for one or more of said plurality of terms.

7. The method of claim 6, wherein at least one of said parameter frequencies comprises a term/record frequency associated with a particular term, and determining said term weight comprises multiplying said term/record frequency associated with said particular term with a log of the inverse of a corresponding record frequency.

8. The method of claim 1, wherein at least one of said parameter frequencies comprises at least one weighed term/record frequency.

9. The method of claim 1, further comprising:
sorting said plurality of terms based, at least in part, on said respective parameter frequencies.

10. The method of claim 1, further comprising:
performing an information similarity determination process based at least in part on at least a portion of said termIDs.

11. The method of claim 10, wherein said information similarity determination process comprises a similarity join operation.

12. The method of claim 10, further comprising:
performing said information similarity determination process using said plurality of termIDs, wherein said plurality of termIDs are assigned to said plurality of terms based, at least in part, on their respective parameter frequencies.

13. The method of claim 10, wherein performing said information similarity determination process comprises generating one or more statistics associated with said one or more records of said record set.

14. The method of claim 10, further comprising:
performing one or more optimizations for said information similarity determination process operation.

15. The method of claim 14, wherein at least one of said one or more optimizations comprises a summary statistics optimization.

16. The method of claim 10, wherein said information similarity determination process uses one or more similarity functions based, at least in part on, or convertible to, an overlap coefficient similarity or a vector dot product.

17. The method of claim 10, further comprising: generating one or more candidate pairs based, at least on part, on said information similarity determination process.

18. The method of claim 1, further comprising determining term weights for said plurality of terms as a function of said respective parameter frequencies for said plurality of terms.

19. The method of claim 1, further comprising performing a second map/reduce iteration to determine an overlap of said prefixes.

20. The method of claim 19, further comprising performing a third map/reduce iteration to generate one or more keys for said one or more records to be emitted based at least in part on said overlap of said prefixes.

21. The method of claim 1, wherein the multiple map/reduce iterations are further implemented to filter out terms of said plurality of terms comprising a suffix of said one or more records.

22. A method, comprising:
accessing a record set comprising a plurality of records;
generating a plurality of terms for said plurality of records, individual ones of said plurality of terms comprising a q-gram of a fixed character length;

filtering out terms comprising a suffix of said one or more records;
determining a plurality of respective parameter frequencies for said plurality of terms in response to said filtering;
at least partially in response to said determining a plurality of respective parameter frequencies, assigning particular termIDs to said plurality of terms based, at least in part, on said respective parameter frequencies, wherein said particular termIDs comprise an identifier to indicate a term/record frequency within said record set; and
comparing one or more positions of said termIDs for first terms of a first vector of terms for a first candidate record and for second terms of a second vector of terms for a second candidate record to determine whether there is an overlap between the first and second vectors.

* * * * *